United States Patent [19]

Fafard

[11] Patent Number: 4,502,826
[45] Date of Patent: Mar. 5, 1985

[54] TOGGLE FASTENER
[75] Inventor: Jean-Claude Fafard, Montreal, Canada
[73] Assignee: Centre de Recherche Industrielle du Quebec, Quebec, Canada
[21] Appl. No.: 494,885
[22] Filed: May 16, 1983
[51] Int. Cl.³ .............................................. F16B 13/04
[52] U.S. Cl. ................................................... 411/340
[58] Field of Search ........................ 411/15, 29, 30, 31, 411/340, 341, 342, 343, 344, 345, 346

[56] References Cited
U.S. PATENT DOCUMENTS

| | | |
|---|---|---|
| 1,003,527 | 9/1911 | Smith . |
| 1,051,893 | 2/1913 | Joseph . |
| 1,738,133 | 12/1929 | Anderson ............................ 411/345 |
| 1,854,737 | 4/1932 | Haug . |
| 2,024,871 | 12/1935 | Parsons .............................. 411/342 |
| 2,181,278 | 11/1939 | Lantz ............................. 411/340 X |
| 2,398,220 | 4/1946 | Gepcke .............................. 411/342 |
| 2,519,511 | 8/1950 | Stelter ............................... 411/342 |
| 2,933,969 | 4/1960 | Huyssen ......................... 411/346 X |
| 2,950,141 | 8/1960 | Koff ............................... 411/341 X |
| 3,288,014 | 11/1966 | Mortensen . |
| 3,513,746 | 5/1970 | Forsberg ............................ 411/346 |
| 4,079,655 | 3/1978 | Roberson, Jr. . |
| 4,298,298 | 11/1981 | Pontone ......................... 411/346 X |
| 4,398,855 | 8/1983 | Hultquist ............................ 411/340 |

FOREIGN PATENT DOCUMENTS 1240562  8/1960  France ................................ 411/346

Primary Examiner—Thomas J. Holko
Attorney, Agent, or Firm—Cushman, Darby & Cushman

[57] ABSTRACT

The disclosure herein describes a device for fastening objects to thin or hollow walls which comprises: a bolt, a nut with an aperture, a guide blade mounted to the bolt and extending lengthwise thereof and a bascule mounted to the bolt and interconnected to the nut; pivotal movement of the bascule on and relative to the bolt is caused by the nut being threadedly displaced along the shank portion of the bolt as a result of the screw being rotated; the guide blade extends through the aperture of the nut and prevents it from rotating with the screw.

14 Claims, 12 Drawing Figures

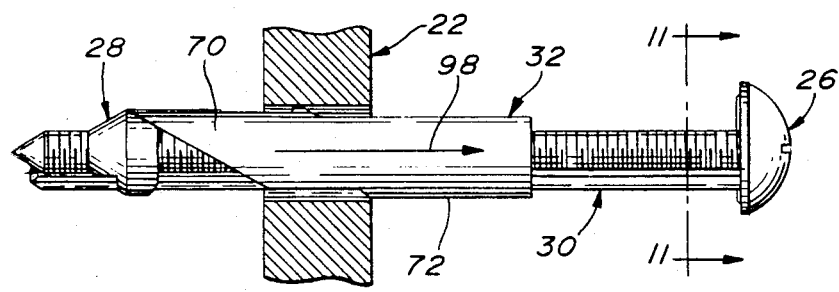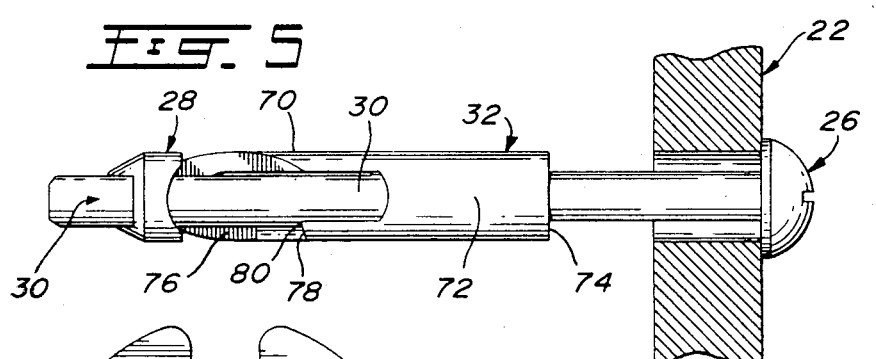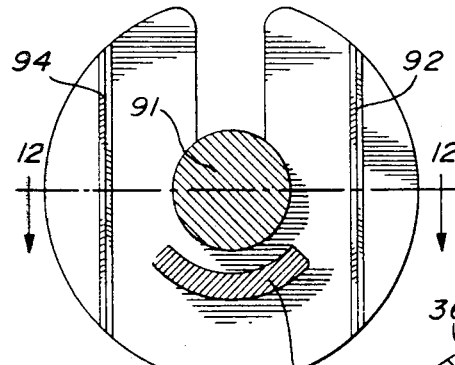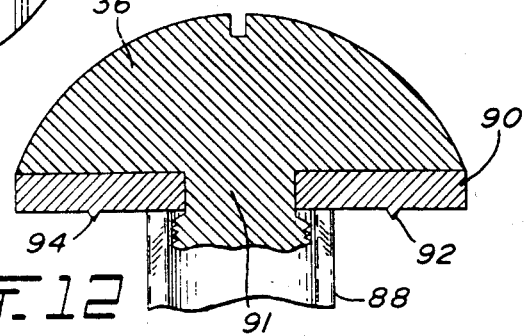

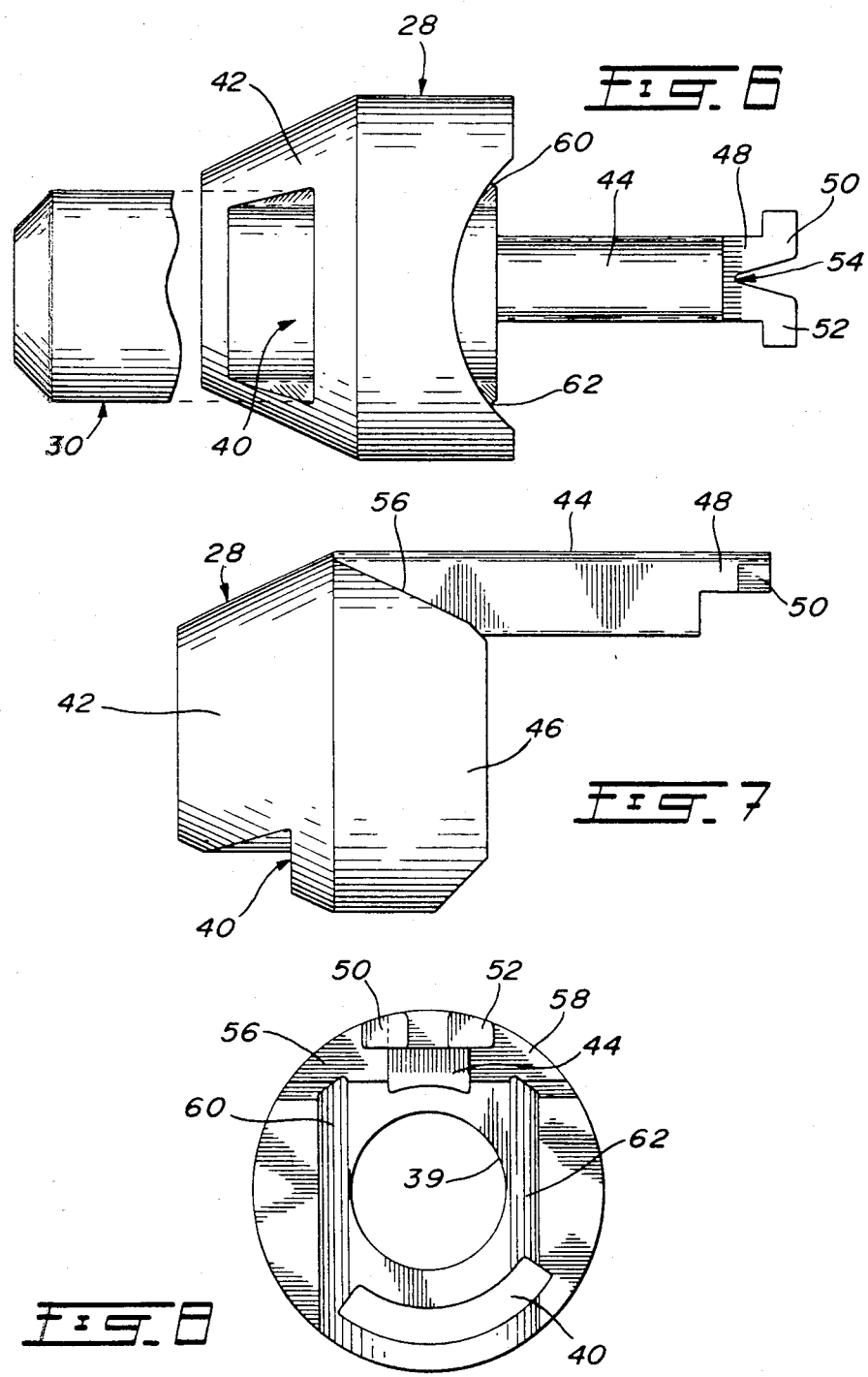

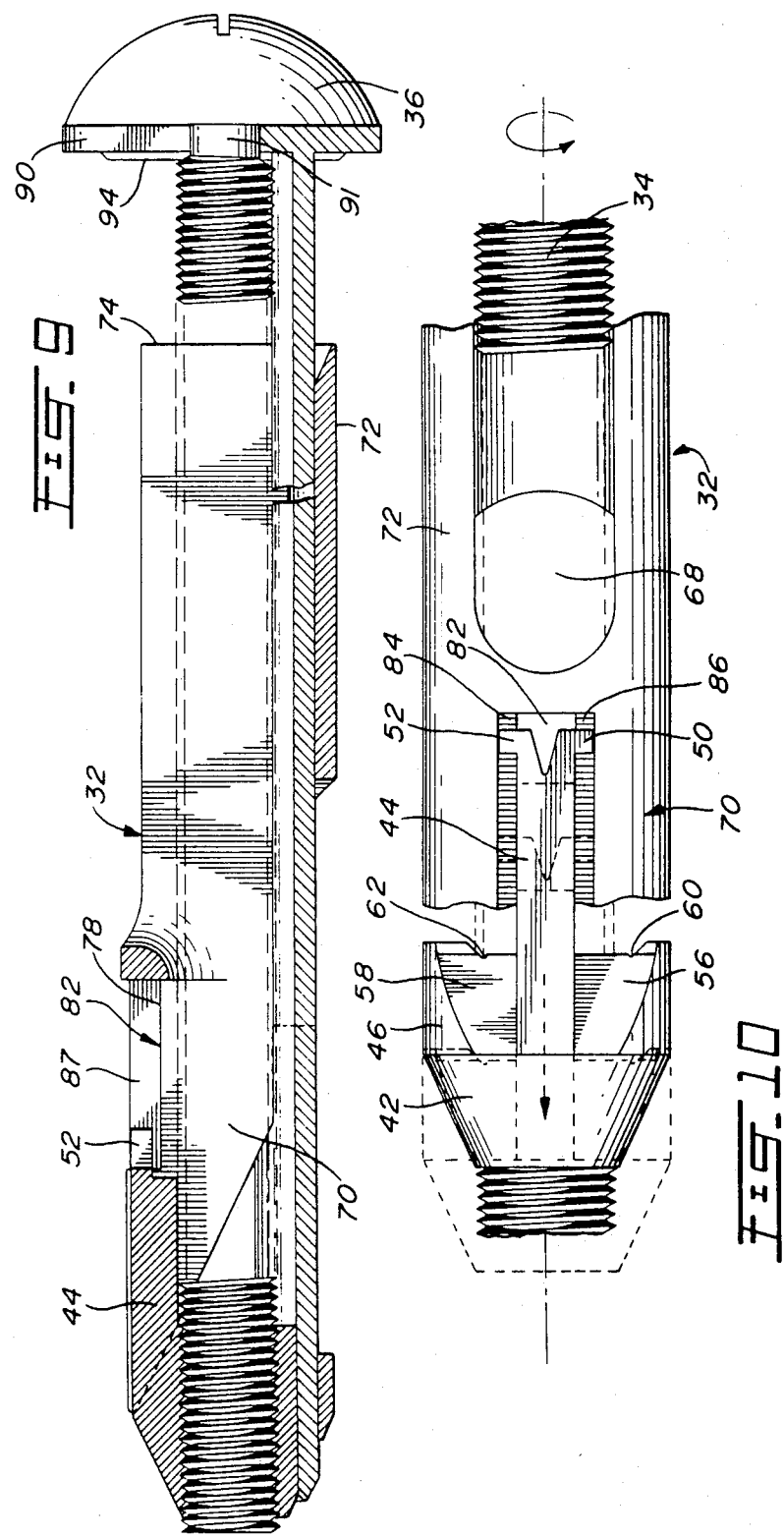

4,502,826

TOGGLE FASTENER

FIELD OF THE INVENTION

The present invention pertains to a device for fastening objects to thin or hollow walls and, more particularly, to a fastener of the toggle type which is insertable through a constricted passage of a wall and has portions engaging surfaces inaccessible from the rear.

BACKGROUND OF THE INVENTION

There are several prior art fastening devices which have a configuration that allows them to pass through a constricted passage in a wall and afford a firm and permanent anchor by having one of his component engaging the inner faces of the wall. In many of these prior art devices, it is extremely difficult and, in some cases, impossible to retract the entire fastening device from a wall for reuse. For example, in U.S. Pat. No. 4,079,655 issued Mar. 21, 1978 to Robertson, a toggle bolt is illustrated having a wing assembly which, under the action of a resilient strip member, is popped in a position which allows it to be pulled through the constricted passage. However, in this toggle bolt arrangement as well as in many others where retrieval of all the assembly is desired, since the user must, on one side of the wall, manoeuver the bolt so that an element on the inaccessible side of the wall can be operated, very often the wing assembly or like component will drop off the bolt as a result of not being permitted to see what is done, such as having gone too far in the rotation of the bolt, for example.

OBJECTS OF THE PRESENT INVENTION

It is an object of the present invention to provide a fastening device which allows the pivotal movement of one component thereof into a wall-engaging position when the screw is rotated in one direction and in a retractable longitudinal position when rotated in the opposite direction.

It is also an object of the present invention to provide a removable fastening device which prevents the said component from falling off the bolt behind the wall against which an object is retained.

The present invention therefore relates to a device for fastening objects to thin or hollow walls having a constricted passage which comprises, in combination:

a bolt with a threaded shank and a head at one end thereof;

a nut threadedly mounted to the shank and having an aperture therethrough;

a guide blade mounted lengthwise of the shank and extending through the aperture of the nut, the guide blade restraining said nut from rotation with the bolt when rotated whereby the nut is threadedly displaced longitudinally along the shank;

a bascule with a central opening adapted to receive the shank and the blade therethrough; and means cooperating with the bascule and the nut for causing the pivotal movement of the bascule on and relative to the shank when the nut is threadedly displaced along the shank whereby the bascule is pivotable in a first wall-engaging position and in a second longitudinal position to thereby permit the fastening device to be removed through the constricted passage.

In one form of the invention, the cooperating means consist of a tongue which has one end fixed to the nut and the opposite end slidably engaged in the bascule.

The scope of applicability of the present invention will become apparent from the detailed description given hereinafter; it should be understood however, that this description, while indicating preferred embodiments of the invention, is given by way of illustration only since various changes and modifications within the spirit and scope of the invention will become apparent to those skilled in the art.

BRIEF DESCRIPTION OF THE DRAWINGS

FIGS. 1, 2, 3 and 4 show the various steps of mounting to and retrieving from a wall the fastening device made in accordance with the present invention;

FIG. 5 is a bottom view of the fastening device in a position close to that illustrated in FIG. 3;

FIG. 6 is a bottom view of the nut of the fastening device of the present invention;

FIG. 7 is an elevation thereof;

FIG. 8 is an end view thereof;

FIG. 9 is an elevation, partly cross-sectional, of the fastening device;

FIG. 10 is a top plan view of part of the fastening device;

FIG. 11 is an end view as seen from line 11—11 of FIG. 4; and

FIG. 12 is a cross-sectional view taken along lines 12—12 of FIG. 11.

DESCRIPTION OF PREFERRED EMBODIMENTS

Figure 1:
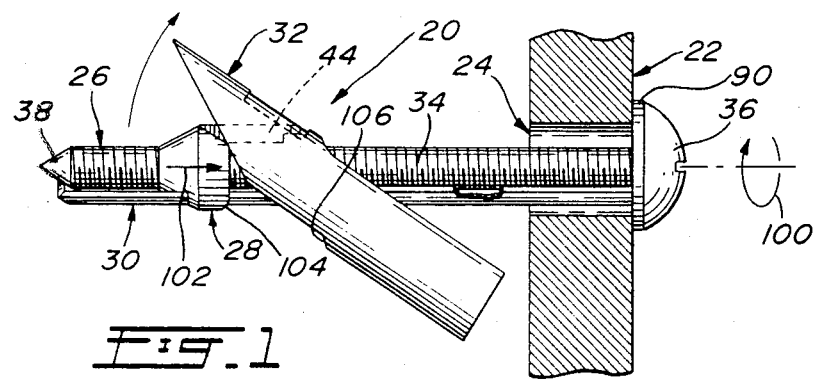

Referring to FIGS. 1–5, the fastening device made in accordance with the present invention, generally denoted 20, is shown mounted through a constricted passage 24 of a thin or hollow wall 22. The fastening device broadly comprises: a bolt 26, a nut 28, a guide blade 30 and a bascule 32.

Bolt 26 has a threaded shank 34 with a head 36 at one end thereof. Preferably, at the other end thereof, a pointed extremity 38 is provided to facilitate insertion, i.e. by piercing, into a wall.

Nut 28 has a threaded bore 39 for passage of the shank portion of the bolt and includes a further longitudinal arcuate opening 40 for a passage of the corresponding shaped guide blade 30 therethrough (see FIGS. 6–8). The front most portion of the nut has a first frusto-conical portion 42, the inclination of which corresponds to that of the conical end 38 of the bolt so that together they define a continuous conical shape which is useful if the fastening device is used to pierce a wall. Nut 28 has a tongue 44 which projects outwardly from its rear portion 46. The rearmost extremity of tongue 44 displays a sliding guide, generally denoted 48, which includes two laterally extending projections 50 and 52 separated by a V-shaped slot 54. The slot provides the lateral projections 50 and 52 with resiliency so that they may be pressed slightly towards one another as explained below. The rear portion 46 of the nut has, adjacent tongue 44, a pair of inclined walls 56 and 58 and two grooves 60 and 62 as described hereinafter.

Figure 2:
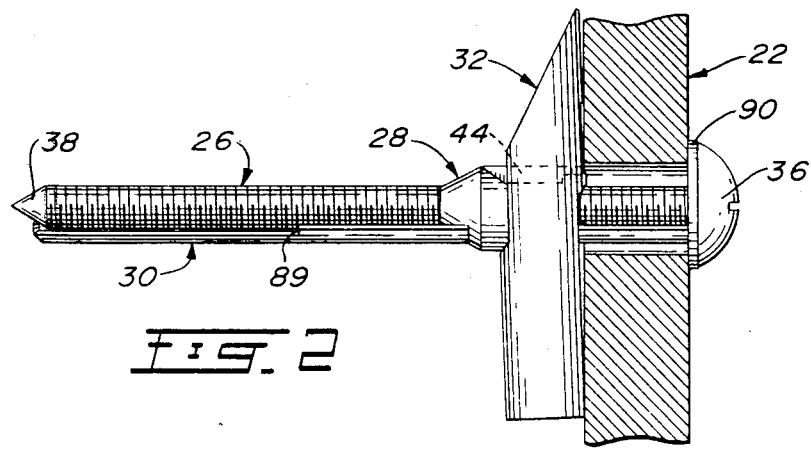
Figure 3:
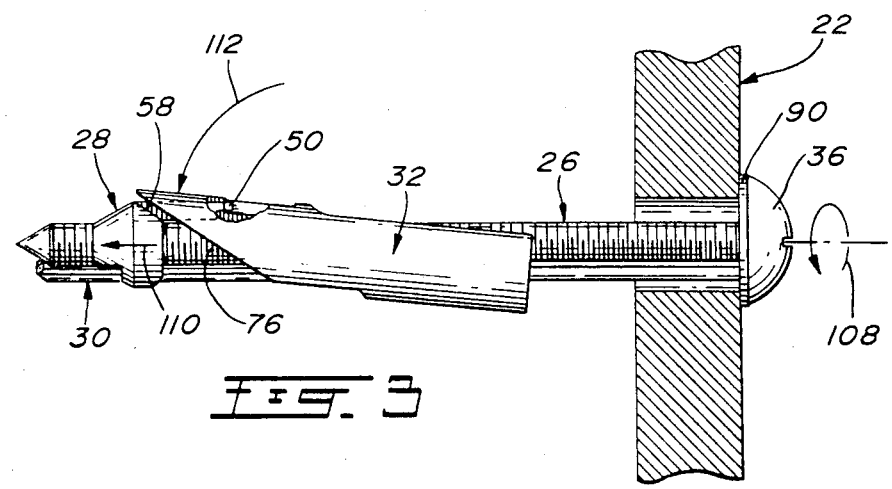

Bascule 32 has a central opening 68 for passage of the shank portion of the bolt (see FIGS. 9 and 10). On opposite sides of this central opening, the bascule is formed of arcuate sections 70 and 72, the latter terminating with an edge 74 while the former has an inclined edge wall 76 adapted to slide on the inclined walls 56 and 58 of the nut. One side of wall 76 has a notch 78 which is adapted to engage a notch 80 on the guide blade 30 (see FIG. 5). Arcuate section 70 of bascule 32 has on the top portion thereof a longitudinal slot 82 extending from about the mid-portion of the bascule to the frontmost extremity thereof. Adjacent this slot, two grooves 84 and 86 are formed in section 70 and are adapted to slidably receive the two projections 50 and 52 of tongue 44 of the nut. These projections are pressed in the slot under pressure thereby exerting friction on the adjacent walls of the grooves, such as wall 87 for projection 52. The width of slot 82 is slightly larger than that of tongue 44 so that tongue may freely extend therethrough when the bascule reaches a pivoted relationship to the shank of the bolt as shown in FIGS. 1-3.

Guide blade 30 prevents rotation of the nut 28 with the bolt when the latter is rotated. The guide blade is arcuate in shape and extends lengthwise of the shank 34 of the bolt. The innerwall of section 72 of the bascule tapers outwardly from opening 68 to the edge 74 and receives thereon the arcuate portion 88 of the blade. The dimensions of parts 72 and 88 are such that there is a frictional engagement between them to assist in the pivotal movement of the bascule as described hereinbelow. As indicated above, the guide blade has a notch 80 to engage notch 78 in the inclined wall 76 of the bascule to prevent the nut from falling off the bolt as well as another notch 89 (see FIG. 2) which is required on the opposite edge of the blade for the insertion of the nut on the guide blade. The guide blade includes an orthogonal portion 90 mounted to an unthreaded portion 91 adjacent head 36 of the bolt. The inner wall of portion 90 has two longitudinal projections 92, 94 which are adapted to contact wall 22 to thereby prevent rotation of the guide blade when head 36 is rotated.

The operation of the fastening device will now be described. The fastening device is first inserted in the constricted passage 24 of the wall 22 in a manner similar to that illustrated in FIG. 4 but in a direction opposite to the direction indicated by arrow 98. The head 36 of the bolt and the portion 90 of the guide blade are brought to cover the passage 24 and to rest against the wall. Head 36 is then rotated in the direction indicated by arrow 100 in FIG. 1. This causes a longitudinal displacement of nut 28 in the direction of arrow 102 since, rotation of the nut is being prevented by the guide blade 30 passing therethrough. As there is frictional contact between the guide blade 30 and the inner wall of the bascule section 72, pivotal movement of the bascule begins and is assisted by inclined wall 76 of the bascule contacting the inclined walls 56 and 58 of the nut. Simultaneously, the two projections 50 and 52 of the tongue 44 slide in grooves 84 and 86 in slot 82, moving rearwardly therein. Rotation of the bolt is continued until the bascule reaches the vertical position shown in FIG. 2 where nut 28 forces the bascule against the inner face of wall 22. Nut 28 and bascule 32 have correspondingly shaped faces 104 and 106 which engage one another when the fastening device is in the position shown.

An important feature of the present invention is that the entire fastening device can be removed from the wall without lost of any of its components. Referring to FIG. 3, to remove the fastening device, bolt 26 is rotated in the direction indicated by arrow 108 thus causing the nut 28 to move in the direction of arrow 110. Due to the link between nut 28 and bascule 32 and to the frictional contact explained above, the latter pivots in the direction indicated by arrow 112. The projections 50 and 52 slide in their respective grooves until edge wall 76 of the bascule comes to rest on the two inclined walls 56 and 58 of the nut. This is a position where the user should stop rotating bolt 26. However, this position is not visible to the user. Therefore, in order to make him aware that the bascule has reached an horizontal position, further rotation in the direction of arrow 108 is prevented by notch 78 engaging notch 80. In the event that the orthogonal portion 90 does not contact the wall, there would be a pull exerted by the nut and bascule on the blade, the orthogonal portion 90 of which would slide on the unthreaded portion 91 of bolt, which orthogonal portion would then engage the threaded portion of the bolt resulting in the entire assembly rotating as a result of rotation of the bolt. This would also prevent the nut from being removed off the end of the bolt. Thereafter, the fastening device is simply pulled out in the direction of arrow 98 with all components being retrieved.

Although the invention has been described above in relation to specific forms of the invention, it will be apparent to the person skilled in the art that it may be refined and modified in various ways. It is therefore wished to have it understood that the present invention should not be limited in interpretation except by the terms of the following claims.

The embodiments of the invention in which an exclusive property or privilege is claimed are defined as follows:

1. A device for fastening objects to thin or hollow walls having a constricted passage comprising, in combination:
   a bolt having a threaded shank and a head at one end thereof;
   a nut threadedly mounted on said shank; said nut having an aperture therethrough;
   a guide blade mounted lengthwise of said shank and extending through the aperture of said nut; said guide blade restraining said nut from rotation with said bolt when rotated whereby said nut is threadedly displaced longitudinally along said shank;
   a bascule having a central opening receiving said shank and said guide blade therethrough; and
   means cooperating with said bascule and said nut for causing pivotal movement of said bascule on and relative to said shank when said nut is threadedly displaced along said shank whereby said bascule is pivotable in a first wall-engaging position and in a second longitudinal position to thereby permit said fastening device to be removed through said constricted passage; said cooperating means consisting of a tongue having one end fixed to said nut and the opposite end slidably engaged in said bascule.

2. A device as defined in claim 1, wherein said bascule has a longitudinal slot extending on one side of said central opening; said tongue extending in said slot when said bascule is in said second position; groove means in said one side adjacent said tongue; said tongue including means engaging said groove means and being slidable therein.

3. A device as defined in claim 1, wherein said guide blade has a width slightly greater than that of the opening of said bascule so as to be frictionally engaged therewith and to assist in the pivotal movement of said bascule.

4. A device as defined in claim 1, wherein the opposite end of said shank is conical.

5. A device as defined in claim 1, wherein said bascule has notch means engageable with notch means on said guide blade for limiting longitudinal displacement of said bascule in said longitudinal position in a direction towards the opposite end of said shank.

6. A device as defined in claim 1, wherein said guide blade has means thereon to engage said walls adjacent said constricted passage to prevent rotation of said guide blade with rotation of said bolt.

7. A device as defined in claim 1, wherein said guide blade includes an elongated curved body having, adjacent said head of said bolt, an orthogonal extension freely engaging said shank.

8. A device as defined in claim 1, wherein said bascule has an opened arc-shaped section on each side of said central opening; the opened section of one side has a bottom wall shaped to receive said guide blade therein when said bascule is pivoted in the longitudinal position.

9. A device for fastening objects to thin or hollow walls having a constricted passage comprising, in combination:

- a bolt having a threaded shank and a head at one end thereof;
- a nut threadedly mounted on said shank; said nut having an aperture therethrough;
- a guide blade mounted lengthwise of said shank and extending through the aperture of said nut; said guide blade restraining said nut from rotation with said bolt when rotated whereby said nut is threadedly displaced longitudinally along said shank;
- a bascule having a central opening receiving said shank and said guide blade therethrough;
- means cooperating with said bascule and said nut for causing pivotal movement of said bascule on and relative to said shank when said nut is threadedly displaced along said shank whereby said bascule is pivotable in a first wall-engaging position and in a second longitudinal position to thereby permit said fastening device to be removed through said constricted passage; and
- said bascule having notch means engageable with notch means on said guide blade for limiting longitudinal displacement of said bascule in said longitudinal position in a direction towards the opposite end of said shank.

10. A device as defined in claim 9, wherein said guide blade has means thereon to engage said walls adjacent said constricted passage to prevent rotation of said guide blade with rotation of said bolt.

11. A device as defined in claim 9, wherein said guide blade includes an elongated curved body having, adjacent said head of said bolt, an orthogonal extension freely engaging said shank.

12. A device for fastening objects to thin or hollow walls having a constricted passage comprising, in combination:

- a bolt having a threaded shank and a head at one end thereof;
- a nut threadedly mounted on said shank; said nut having an aperture therethrough;
- a guide blade mounted lengthwise of said shank and extending through the aperture of said nut; said guide blade restraining said nut from rotation with said bolt when rotated whereby said nut is threadedly displaced longitudinally along said shank;
- a bascule having a central opening receiving said shank and said guide blade therethrough;
- means cooperating with said bascule and said nut for causing pivotal movement of said bascule on and relative to said shank when said nut is threadedly displaced along said shank whereby said bascule is pivotable in a first wall-engaging position and in a second longitudinal position to thereby permit said fastening device to be removed through said constricted passage; and
- said bascule having an opened arc-shaped section of each side of said central opening; the opened section of one side having a bottom wall shaped to receive said guide blade therein when said bascule is pivoted in the longitudinal position.

13. A device as defined in claim 12, wherein the opened section of the other side of said bascule has an inclined profile to slidably engage a correspondingly shaped profile on said nut.

14. A device as defined in claim 13, wherein said nut includes two grooves for receiving therein portions of said inclined profile of said bascule.

* * * * *